(12) United States Patent
Lee

(10) Patent No.: US 11,048,342 B2
(45) Date of Patent: *Jun. 29, 2021

(54) DUAL MODE OPTICAL NAVIGATION DEVICE

(71) Applicant: PixArt Imaging Inc., Hsin-Chu County (TW)

(72) Inventor: Sai-Mun Lee, Penang (MY)

(73) Assignee: PIXART IMAGING INC., Hsin-Chu County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/730,046

(22) Filed: Dec. 30, 2019

(65) Prior Publication Data
US 2020/0142510 A1 May 7, 2020

Related U.S. Application Data

(63) Continuation of application No. 16/237,786, filed on Jan. 2, 2019, now Pat. No. 10,558,279, which is a
(Continued)

(51) Int. Cl.
*G06F 3/0354* (2013.01)
*G06F 3/0338* (2013.01)
(Continued)

(52) U.S. Cl.
CPC .......... *G06F 3/03543* (2013.01); *G06F 3/017* (2013.01); *G06F 3/0304* (2013.01);
(Continued)

(58) Field of Classification Search
CPC .... G06F 3/03543; G06F 3/017; G06F 3/0304; G06F 3/0338; G06F 3/0362; G06F 3/0346
See application file for complete search history.

(56) References Cited

U.S. PATENT DOCUMENTS

| 5,936,612 A * | 8/1999 | Wang ...................... G06F 3/038 345/164 |
| 6,844,871 B1 * | 1/2005 | Hinckley ............. G06F 3/0317 345/163 |

(Continued)

FOREIGN PATENT DOCUMENTS

| CN | 101452349 A | 6/2009 |
| CN | 102033630 A | 4/2011 |

(Continued)

*Primary Examiner* — Amy Onyekaba
(74) *Attorney, Agent, or Firm* — WPAT, PC

(57) ABSTRACT

There is provided a dual mode optical navigation device. The dual mode optical navigation device is configured to operate in a first mode or a second mode on a working surface. The dual mode optical navigation device includes an image sensor and a processor. The image sensor captures an image frame of the working surface. The processor calculates a ratio of a bright area and a dark area in one image frame capture by the image sensor, enters the first mode in response to the calculated ratio being larger than a ratio threshold, and enters the second mode in response to the calculated ratio being within a ratio threshold range. The ratio threshold range is smaller than the ratio threshold.

14 Claims, 4 Drawing Sheets

Related U.S. Application Data continuation of application No. 15/919,698, filed on Mar. 13, 2018, now Pat. No. 10,209,787, which is a continuation of application No. 15/596,595, filed on May 16, 2017, now Pat. No. 9,958,965, which is a continuation of application No. 14/165,831, filed on Jan. 28, 2014, now abandoned.

(51) Int. Cl.
- *G06F 3/0362* (2013.01)
- *G06F 3/0346* (2013.01)
- *G06F 3/01* (2006.01)
- *G06F 3/03* (2006.01)

(52) U.S. Cl.
CPC .......... *G06F 3/0338* (2013.01); *G06F 3/0346* (2013.01); *G06F 3/0362* (2013.01)

(56) References Cited

U.S. PATENT DOCUMENTS

| Patent/Publication | Date | Inventor | Classification |
|---|---|---|---|
| 6,950,141 B2 * | 9/2005 | Mori | G03B 7/08 348/362 |
| 7,444,006 B2 * | 10/2008 | Lin | G06T 7/0004 345/158 |
| 8,063,882 B2 * | 11/2011 | Hinckley | G06F 3/0346 345/166 |
| 2004/0032392 A1 * | 2/2004 | Chi | G06F 3/03546 345/156 |
| 2004/0130531 A1 * | 7/2004 | Cheng | G06F 3/03541 345/163 |
| 2004/0207543 A1 * | 10/2004 | Yen | G06F 3/03549 341/31 |
| 2005/0104854 A1 * | 5/2005 | Su | G06F 3/03543 345/163 |
| 2005/0116933 A1 * | 6/2005 | Huang | G06F 3/03545 345/163 |
| 2006/0092145 A1 * | 5/2006 | Kim | G06F 3/03545 345/179 |
| 2008/0068328 A1 * | 3/2008 | Jou | G09G 3/3406 345/102 |
| 2008/0142691 A1 * | 6/2008 | Ooi | G06F 3/0317 250/221 |
| 2008/0158158 A1 * | 7/2008 | Cheah | G06F 3/0317 345/166 |
| 2008/0266251 A1 * | 10/2008 | Chao | G06F 3/0312 345/157 |
| 2008/0278445 A1 * | 11/2008 | Sweetser | G06F 3/0325 345/158 |
| 2009/0002347 A1 * | 1/2009 | Ming | G06F 3/03543 345/182 |
| 2009/0153482 A1 * | 6/2009 | Weinberg | G06F 3/03 345/163 |
| 2009/0153485 A1 * | 6/2009 | Bohn | G06F 3/042 345/166 |
| 2009/0153486 A1 * | 6/2009 | Bohn | G06F 3/0317 345/166 |
| 2011/0013001 A1 * | 1/2011 | Craven-Bartle | G06K 9/2036 348/61 |
| 2011/0090179 A1 * | 4/2011 | Lai | G06F 3/0317 345/179 |
| 2011/0141371 A1 * | 6/2011 | Lo | H04N 5/57 348/673 |
| 2012/0020529 A1 * | 1/2012 | Chen | H04N 5/145 382/107 |
| 2012/0193431 A1 * | 8/2012 | Hawley | G06K 7/10851 235/472.01 |
| 2012/0318775 A1 * | 12/2012 | Schwarz | B23K 26/032 219/121.63 |
| 2013/0051617 A1 * | 2/2013 | Chen | G06T 7/136 382/103 |
| 2013/0072771 A1 * | 3/2013 | Gu | G06F 3/0425 600/324 |
| 2013/0088429 A1 * | 4/2013 | Yang | G06F 3/0304 345/158 |
| 2013/0100023 A1 * | 4/2013 | Chen | G06F 3/04166 345/166 |
| 2013/0113705 A1 * | 5/2013 | Gu | G06F 3/0317 345/166 |
| 2013/0113759 A1 * | 5/2013 | Gu | G06F 3/03547 345/175 |
| 2013/0127714 A1 * | 5/2013 | Gu | G06F 3/0317 345/158 |
| 2013/0127721 A1 * | 5/2013 | Gu | A61B 5/14552 345/166 |
| 2013/0127722 A1 * | 5/2013 | Gu | G06F 3/021 345/166 |
| 2013/0131473 A1 * | 5/2013 | Gu | A61B 5/14552 600/324 |
| 2013/0131474 A1 * | 5/2013 | Gu | A61B 5/02416 600/324 |
| 2013/0215257 A1 * | 8/2013 | Huang | G06F 3/0325 348/86 |
| 2013/0222346 A1 * | 8/2013 | Chen | G06F 3/0425 345/175 |
| 2013/0329098 A1 * | 12/2013 | Lim | H04N 5/232933 348/246 |
| 2014/0022168 A1 * | 1/2014 | Kao | G06F 3/0386 345/157 |
| 2014/0307117 A1 * | 10/2014 | Feng | H04N 5/2351 348/218.1 |
| 2015/0009146 A1 * | 1/2015 | Song | G06F 3/0317 345/166 |
| 2015/0022449 A1 * | 1/2015 | Cheng | G06F 3/0304 345/163 |
| 2016/0007830 A1 * | 1/2016 | Chun | G06T 7/90 600/476 |

FOREIGN PATENT DOCUMENTS

| | | |
|---|---|---|
| CN | 102473070 A | 5/2012 |
| WO | WO2014009933 A1 * | 1/2014 |

* cited by examiner

DUAL MODE OPTICAL NAVIGATION DEVICE

RELATED APPLICATIONS

The present application is a continuation application of U.S. application Ser. No. 16/237,786, filed on Jan. 2, 2019, which is a continuation application of U.S. application Ser. No. 15/919,698, filed on Mar. 13, 2018, which is a continuation application of U.S. application Ser. No. 15/596,595, filed on May 16, 2017, which is a continuation application of U.S. application Ser. No. 14/165,831, filed on Jan. 28, 2014, the disclosures of which are hereby incorporated by reference herein in their entirety.

BACKGROUND

1. Field of the Disclosure

This disclosure generally relates to an optical navigation device and, more particularly, to a dual mode optical navigation device that may switch the operation mode according to different operating states.

2. Description of the Related Art

The conventional optical navigation device, such as an optical mouse, generally includes a light source, an image sensor and a process unit. When a user operates the optical mouse on a working surface, the light source illuminates the working surface and the image sensor receives light reflected from the working surface. The process unit of the optical mouse calculates a movement value corresponding to the user's operation according to the images successively captured by the image sensor and converts the movement value to an electric signal. A host then relatively controls a cursor movement according to the electric signal.

With the popularity of gesture operations, users can perform gesture operations via a touch interface such as a touch pad or a touch screen, for example in Microsoft Windows 8, Google Android and Apple iOS. Compared with the touch interface, conventional optical mice only have limited applications due to only being able to relatively control cursor movements according to the movement value.

For increasing functions (or operating modes) of the optical mouse, a roller is generally added to the optical mouse to be operated by the user, e.g. rolling the roller to implement window scrolling or zooming in/out, or a plurality of buttons for performing relative functions are added. However, using such additional elements to improve the user experience, the optical mouse can have problems of low accuracy, poor durability (e.g. due to abrasion of the roller) and large volume (e.g. due to ergonomic design of the pressing area of the buttons).

Accordingly, the present disclosure further provides a dual mode optical navigation device and a mode switching method thereof that have a cursor control mode and a gesture operation mode simultaneously.

SUMMARY

The present disclosure provides a dual mode optical navigation device that may replace the function of the roller in conventional optical navigation devices so as to increase the practicality.

The present disclosure further provides a dual mode optical navigation device that may perform gesture operations according to a displacement of the navigation device relative to a working surface so as to enhance the user experience.

The present disclosure provides a dual mode optical navigation device configured to operate in a first mode or a second mode on a working surface. The dual mode optical navigation device includes an image sensor and a processor. The image sensor is configured to capture an image frame of the working surface. The processor is configured to calculate a ratio of a bright area and a dark area in one image frame captured by the image sensor, enter the first mode in response to the calculated ratio being larger than a ratio threshold, and enter the second mode in response to the calculated ratio being within a ratio threshold range. The ratio threshold range is smaller than the ratio threshold.

The present disclosure further provides a dual mode optical navigation device configured to operate in a first mode or a second mode on a working surface. The dual mode optical navigation device includes an image sensor and a processor. The image sensor is configured to capture an image frame of the working surface. The processor is configured to calculate a first average brightness of a fully bright image frame, and enter the first mode in response to the first average brightness being larger than a brightness threshold, and calculate a second average brightness of a bright area and a dark area contained in one captured image frame, and enter the second mode in response to the second brightness within a brightness threshold range.

The present disclosure further provides an optical navigation device configured to operate on a working surface to control a cursor movement or perform a gesture operation. The optical navigation device includes an image sensor and a processor. The image sensor is configured to capture an image frame of the working surface. The processor is configured to calculate a ratio of a bright area and a dark area in one image frame captured by the image sensor, control the cursor movement in response to the calculated ratio being larger than or equal to a ratio threshold, perform the gesture operation in response to the calculated ratio being within a ratio threshold range, wherein the ratio threshold range is smaller than the ratio threshold, and neither control the cursor movement nor perform the gesture operation in response to the calculated ratio being between the ratio threshold and the ratio threshold range.

In one embodiment, the first mode is configured to control a cursor movement according to image frames captured by the image sensor; and the second mode is configured to perform a gesture operation according to image frames captured by the image sensor.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1:
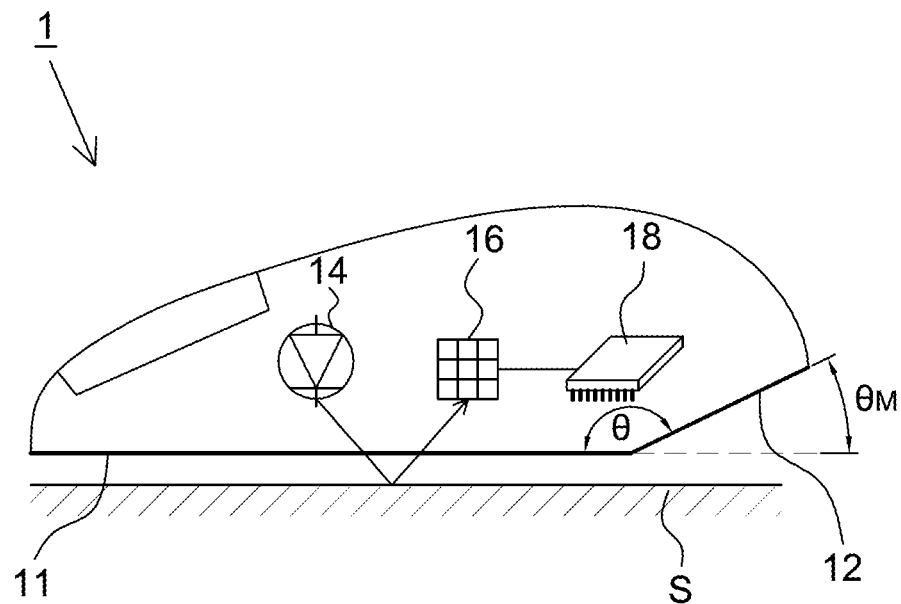
FIG. 1 shows a schematic diagram of the dual mode optical navigation device operating in the first mode according to the first embodiment of the present disclosure.
Figure 2:
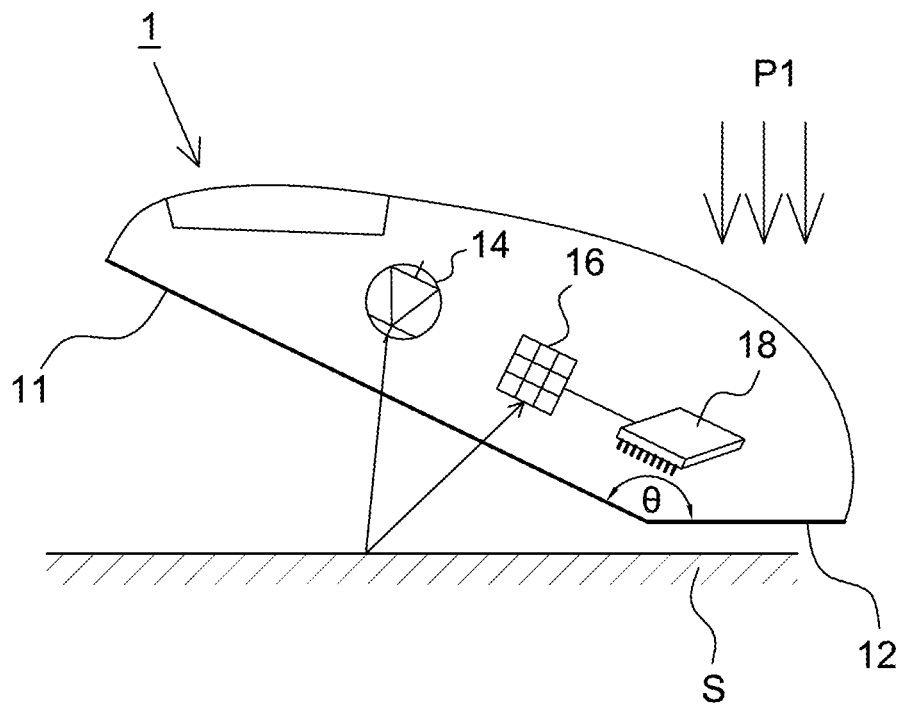
FIG. 2 shows a schematic diagram of the dual mode optical navigation device operating in the second mode according to the first embodiment of the present disclosure.

Referring to FIG. 1 and FIG. 2, FIG. 1 shows a schematic diagram of a dual mode optical navigation device 1 operating in a first mode according to the first embodiment of the present disclosure and FIG. 2 shows a schematic diagram of the dual mode optical navigation device 1 operating in a second mode according to the first embodiment of the present disclosure. The dual mode optical navigation device 1 includes a first bottom surface 11, a second bottom surface 12, a light source 14, an image sensor 16 and a process unit 18. The image sensor 16 is electrically connected to the process unit 18. A user (not shown) may operate the dual mode optical navigation device 1 on a working surface S in a first mode or a second mode with his/her palm or a plurality of fingers, wherein the first bottom surface 11 of the dual mode optical navigation device 1 is configured to be contacted with the working surface S in the first mode and the second bottom surface 12 of the dual mode optical navigation device 1 is configured to be contacted with the working surface S in the second mode.

The dual mode optical navigation device 1 may be an optical mouse device and connected to a mobile device, a smart TV, a computer system or the like through wire/wireless protocols such as PS/2, USB, Bluetooth or Wi-Fi so as to perform corresponding actions accordingly, e.g. controlling a cursor movement when the dual mode optical navigation device 1 operates in the first mode and performing a gesture operation when the dual mode optical navigation device 1 operates in the second mode, or vice versa. It is appreciated that controlling a cursor movement herein may be referred to controlling a cursor movement on a display device; and performing a gesture operation herein may include window scrolling, object zooming and volume control. In addition, the dual mode navigation device 1 of the present disclosure may further cooperate with an application program to extend the gesture operation thereof.

In addition, those skilled in the art are appreciated that the dual mode optical navigation device 1 may further have a housing for the user to put the palm or finger(s) thereon so as to perform operations, and the housing is also configured to protect the above mentioned elements. It is appreciated that the first bottom surface 11 and the second bottom surface 12 are a part of the bottom surface of the housing respectively, as shown in FIG. 1.

The dual mode optical navigation device 1 may be operated by contacting the working surface S with the first bottom surface 11 in user operation. In the present embodiment, a contact area of the first bottom surface 11 is preferably larger than a contact area of the second bottom surface 12 so that the dual mode optical navigation device 1 may preset the first bottom surface 11, but not limited to, to contact with the working surface S.

There is an included angle θ between the second bottom surface 12 and the first bottom surface 11, wherein the second bottom surface 12 is located at a back end of the first bottom surface 11 under the dual mode optical navigation device 1, as shown in FIG. 1, but the present disclosure is not limited thereto. In other embodiments, the second bottom surface 12 of the dual mode optical navigation device 1 may be located at a left end or a right end of the first bottom surface 11 under the dual mode optical navigation device 1. For conforming to ergonomic design, the included angle θ is preferably within 150-180 degrees.

It should be mentioned that in the present disclosure the dual mode optical navigation device 1 is described with only one second bottom surface (i.e. the second bottom surface 12). In other embodiments, the dual mode optical navigation device 1 may have a plurality of second bottom surfaces 12 located at at least one of a back end, a left end or a right end of the first bottom surface 11 under the dual mode optical navigation device 1. For example, the dual mode optical navigation device 1 may have two second bottom surfaces 12 respectively located at a left end and a right end of the first bottom surface 11 under the dual mode optical navigation device 1 so that the dual mode optical navigation device 1 may be adapted to both left-handed users and right-handed users.

In addition, the dual mode optical navigation device 1 may be operated by contacting the working surface S with the second bottom surface 12 in user operation. Since the first bottom surface 11 and the second bottom surface 12 have the included angle θ therebetween, the first bottom surface 11 and the second bottom surface 12 of the dual mode optical navigation device 1 do not contact with the working surface S at the same time. When the first bottom surface 11 contacts the working surface S, there forms a maximum operating angle $\theta_M$ (i.e. a complementary angle of the included angle θ) between the second bottom surface 12 and the working surface S. Similarly, there forms the maximum operating angle $\theta_M$ between the first bottom surface 11 and the working surface S when the second bottom surface 12 contacts the working surface S. That is to say, the dual mode optical navigation device 1 has an operating angle between the angles of $\theta$-$\theta_M$.

The light source 14 may illuminate the working surface S through an opening or a light transmissive medium (not shown) at the first bottom surface 11, wherein the light source 14 may be a light emitting diode (LED), a laser diode (LD) or other active light sources. The spectrum of the light source 14 is preferably adapted to a spectrum range that the image sensor 16 can receive. Furthermore, a light guide element may be disposed on the optical path between the light source 14 and the image sensor 16 so that the image sensor 16 can receive reflective light field of the light source 14 effectively.

The image sensor 16 is configured to capture image frames of the working surface S through the opening or the light transmissive medium of the first bottom surface 11, wherein the image sensor may be a complementary metal oxide semiconductor (CMOS) image sensor or charge-coupled device (CCD) image sensor, but not limited thereto. Furthermore, to prevent external light sources from disturbing the image sensor 16 in capturing the image frame, the image sensor 16 may be covered with a film coating configured to filter out spectrums rather than the spectrum of the light source 14.

In an embodiment, the image sensor 16 may be embedded in the process unit 18. In another embodiment, the image sensor 16 may be integrated with the light source 14 as an optical unit.

It should be mentioned that no matter which of the first bottom surface 11 or the second bottom surface 12 of the dual mode optical navigation device 1 contacts with the working surface S, the light source 14 has to illuminate the working surface S to provide reflective light needed by the image sensor 16 while capturing image frames. Therefore, the spatial relationship between the light source 14, the image sensor 16, the first bottom surface 11 and the second bottom surface 12 is arranged in a way so that the image sensor 16 can receive reflected light from the working surface S in both the first and second modes.

The process unit 18 is configured to calculate an image feature of the image frame and accordingly enter the first mode or the second mode. The process unit 18 may be a digital signal processor (DSP) or other process devices that can be used to process image data according to the image frame captured by the image sensor 16. The process unit 18 is not limited to software or hardware. Preferably, the process unit 18 may control the light source 14 to turn on and off.

Figure 3A:
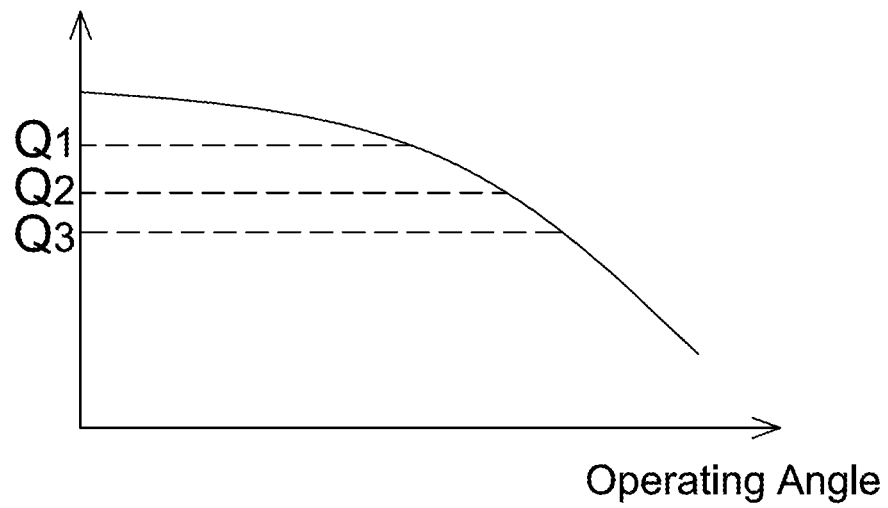
FIG. 3a shows a relationship between the operating angle and the image quality of the dual mode optical navigation device according to the first embodiment of the present disclosure.

It should be mentioned that the image feature of the present embodiment may be an image quality. As shown in FIG. 3a, it shows a relationship between the operating angle and the image quality of the dual mode optical navigation device 1, wherein when the first bottom surface 11 of the dual mode optical navigation device 1 contacts with the working surface S (e.g. the state of FIG. 1), the image quality calculated by the process unit 18 is larger than (or equal to) a quality threshold value (e.g. Q1 of FIG. 3a) and the dual mode optical navigation device 1 enters the first mode. And, when the user applies an external force P1 onto the dual mode optical navigation device 1 to allow the second bottom surface 12 to contact with the working surface S (e.g. the state of FIG. 2), the image quality is within a quality threshold range (e.g. a range from Q2 to Q3 of FIG. 3a) and the dual mode optical navigation device 1 enters the second mode. The image quality may be referred to commonly owned U.S. Pat. Nos. 7,142,695, 7,444,006 and 7,116,801.

The quality threshold and the quality threshold range may be previously saved in a memory unit before the dual mode optical navigation device 1 leaves the factory. It is appreciated that reflective light field received by the image sensor 16 becomes weaker when the dual mode optical navigation device 1 switches from the first mode to the second mode, and thus the quality threshold range is preferably smaller than the quality threshold. For example, Q1 shown in FIG. 3a may be defined as the quality threshold, and the range from Q2 to Q3 may be defined as the quality threshold range; wherein the quality threshold Q1 and the quality threshold range Q2-Q3 may be set according to actual measurement results. In the present embodiment, the range from Q1 to Q2 may be served as a buffer when the dual mode optical navigation device 1 switches from the first mode to the second mode or from the second mode to the first mode so as to prevent misoperations. For example, when the process unit 18 identifies that the image quality of the image frame is within the quality threshold range Q1-Q2, it means that the dual mode optical navigation device 1 is operated neither in the first mode nor in the second mode, and the process unit 18 may not post-process the image frame.

In addition to the above mentioned image quality, in another embodiment the image feature may be an intensity distribution ratio. For example, referring to FIG. 3b, when the first bottom surface 11 of the dual mode optical navigation device 1 contacts with the working surface S (e.g. the state of FIG. 1), an image frame F1 captured by the image sensor 16 is fully bright, and thus the process unit 18 may determine that the intensity distribution ratio of the image frame F1 is larger than or equal to a ratio threshold so as to enter the first mode. When an image frame F2 captured by the image sensor 16 has a bright area and a dark area, the process unit 18 may determine whether the intensity distribution ratio formed by the bright area and the dark area (e.g. bright area/dark area) is within a ratio threshold range to enter the second mode, wherein the ratio threshold range may be smaller than the ratio threshold.

Figure 3B:
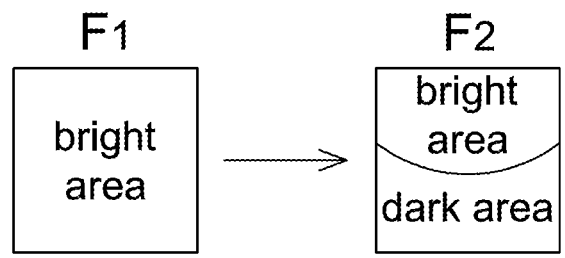
FIG. 3b shows a schematic diagram of image frames captured by the image sensor of the dual mode optical navigation device according to the embodiment of the present disclosure.

In another embodiment, the image feature may be an image brightness value. Referring to FIG. 3b, the process unit 18 may calculate the image brightness value respectively according to two image frames F1 and F2 captured by the image sensor 16, e.g. calculating an average brightness value of two dimensional pixels of the image frame F1 and an average brightness value of two dimensional pixels of the image frame F2 and then comparing the average brightness values with a brightness threshold respectively. Similarly, the process unit 18 may determine whether the image brightness value is larger than or equal to a brightness threshold or within a brightness threshold range so as to enter the first mode or the second mode.

Therefore, in the present disclosure the image feature may include an intensity distribution ratio, an image brightness value or an image quality. Besides, the process unit 18 may further calculate an image profile of the image frame, identify a boundary location in the image frame or process the image frame with other methods to obtain the image feature.

On the other hand, the process unit 18 further calculates a displacement according to image frames of the working surface S successively captured by the image sensor 16. In the present embodiment, the method of the process unit 18 calculating the displacement is well known, e.g. calculating the displacement according to correlations between image frames, and thus details thereof are not described herein.

In the present embodiment, the first mode of the dual mode optical navigation device 1 is configured to control a cursor movement, and the second mode is configured to perform a gesture operation.

Figure 4:
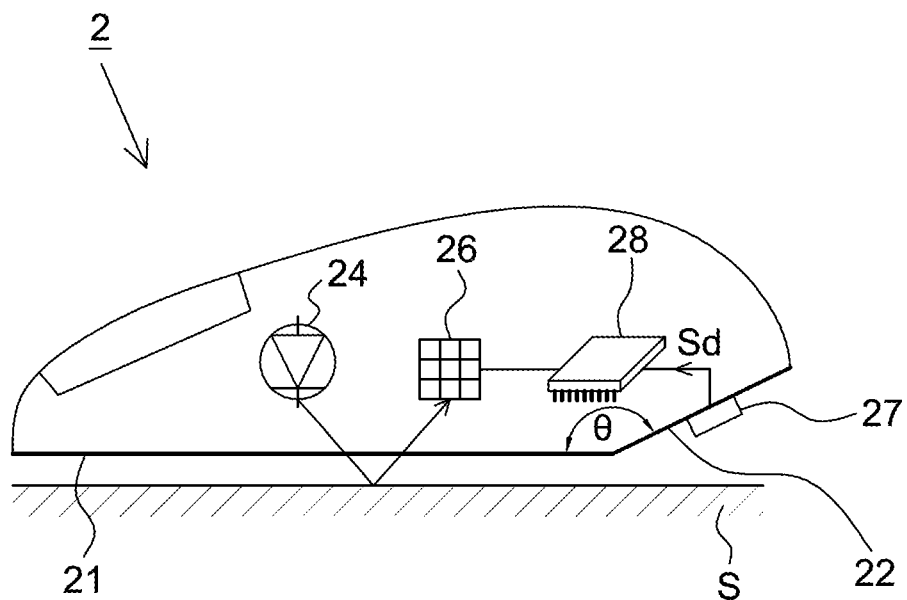
FIG. 4 shows a schematic diagram of the dual mode optical navigation device operating in the first mode according to the second embodiment of the present disclosure.
Figure 5:
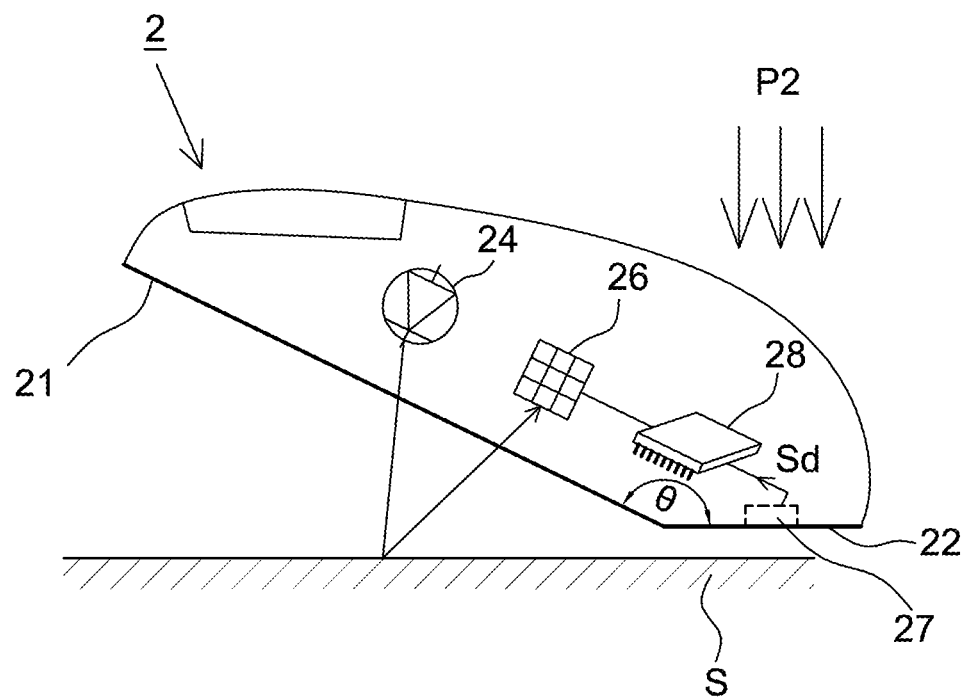
FIG. 5 shows a schematic diagram of the dual mode optical navigation device operating in the second mode according to the second embodiment of the present disclosure.
Figure 6:
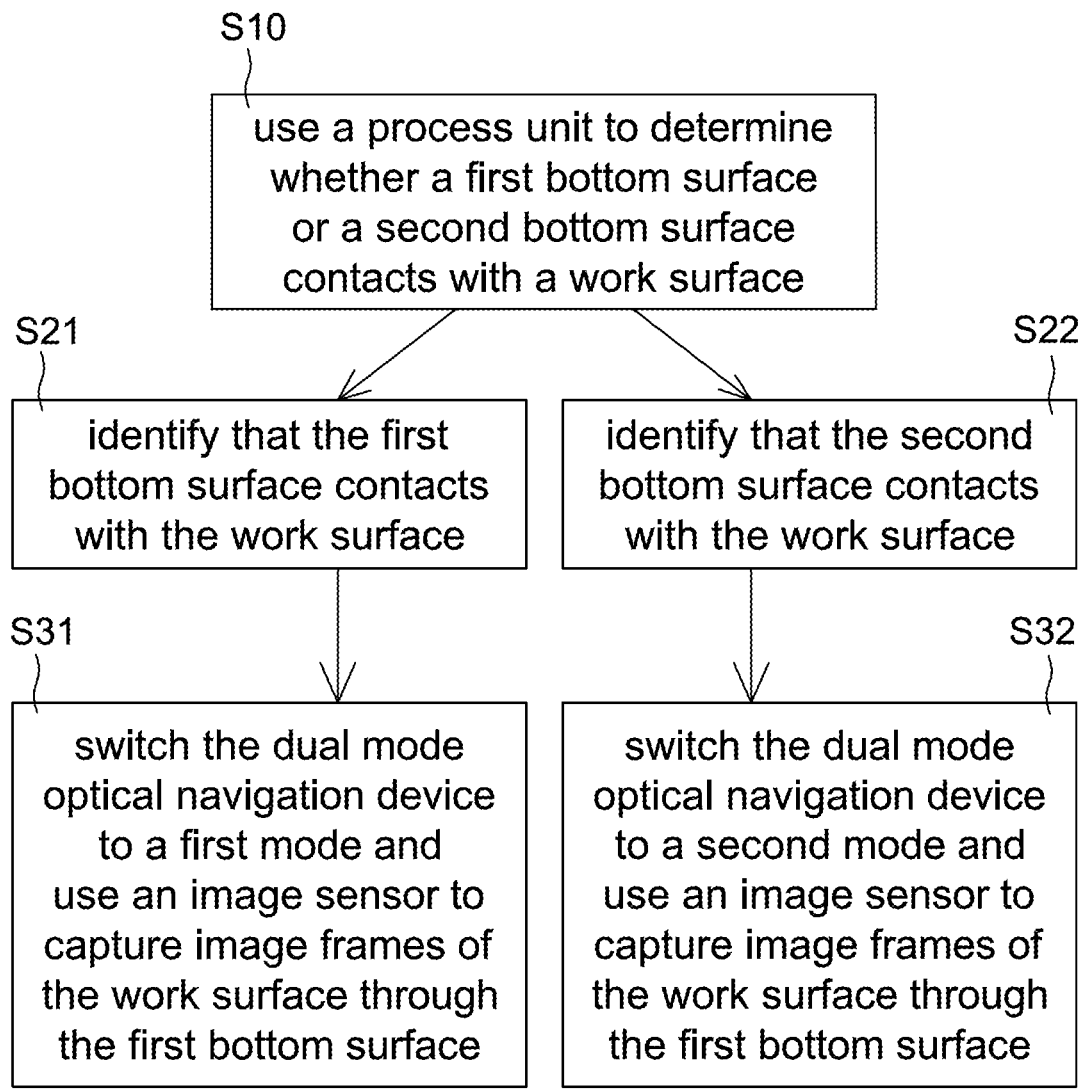
FIG. 6 shows a flow chart of the mode switching method of the dual mode optical navigation system according to the embodiment of the present disclosure.

Referring to FIG. 4 and FIG. 5, FIG. 4 shows a schematic diagram of a dual mode optical navigation device 2 operating in a first mode according to the second embodiment of the present disclosure and FIG. 5 shows a schematic diagram of the dual mode optical navigation device 2 operating in a second mode according to the second embodiment of the present disclosure. The dual mode optical navigation device 2 includes a first bottom surface 21, a second bottom surface 22, a light source 24, an image sensor 26, an actuator 27 and a process unit 28. The image sensor 26 and the actuator 27 are electrically connected to the process unit 28 respectively. The dual mode optical navigation device 2 may be operated in a first mode or a second mode on a working surface S, wherein the first mode is configured to control a cursor movement according to a displacement and the second mode is configured to perform a gesture operation according to the displacement.

Similar to the first embodiment of the present disclosure, there is an included angle θ between the second bottom surface 22 and the first bottom surface 21, and the first bottom surface 21 is configured to be contacted with the working surface S in the first mode and the second bottom surface 22 is configured to be contacted with the working surface S in the second mode. The light source 24 is configured to illuminate the working surface S through the first bottom surface 21. The image sensor 26 is configured to capture image frames of the working surface S thought the first bottom surface 21 for the process unit 28 calculating a displacement, wherein the image sensor 26 captures image frames of the working surface S through the first bottom surface 21 in both the first and second modes.

The difference between the present embodiment and the first embodiment is that the dual mode optical navigation device 2 further has the actuator 27, and the actuator 27 is configured to generate a detect signal Sd when one of the first bottom surface 21 and the second bottom surface 22 in contact with the working surface S changes from the first bottom surface 21 to the second bottom surface 22 or from the second bottom surface 22 to the first bottom surface 21. The process unit 28 may determine whether the dual mode optical navigation device 2 enters the first mode or the second mode according to the detect signal Sd.

Referring to FIG. 4 and FIG. 5, for example when the actuator 27 is a mechanical switch, the actuator 27 of the present embodiment may be disposed at the second bottom surface 22. When the user applies an external force P2 onto the dual mode optical navigation device 2 to allow the second bottom surface 22 to contact with the working surface S, the actuator 27 is pressed and generates a pressed signal. Then the process unit 28 determines that the dual mode optical navigation device 2 enters the second mode according to the pressed signal.

Similarly, when the user releases the external force P2, the dual mode optical navigation device 2 goes back from the state of FIG. 5 to the state of FIG. 4. Meanwhile the actuator 27 recovers and generates a recovery signal, and the process unit 28 determines that the dual mode optical navigation device 2 enters the first mode according to the recovery signal. In the present embodiment, both the pressed signal and the recovery signal are belong to the detect signal Sd.

It should be mentioned that the present embodiment exemplarily shows that the second bottom surface 22 is located at a back end of the first bottom surface 21 under the dual mode optical navigation device 2, and the actuator 27 is disposed at the second bottom surface 22, but the present invention is not limited to. In another embodiment, the dual mode optical navigation device 2 may have two second bottom surfaces 22 respectively located at a left end and a right end of the first bottom surface 21 under the dual mode optical navigation device 2, and the actuator 27 is disposed at the second bottom surface(s) or at the first bottom surface only. Thus the number and location of the actuator 27 of the dual mode optical navigation device 2 may be determined according to actual applications; that is to say, the actuator 27 may be disposed at the first bottom surface 21, the second bottom surface 22 or other locations of the dual mode optical navigation device 2.

On the other hand, the actuator 27 of the present embodiment is exemplarily shown as a physical button, but not limited thereto. The actuator 27 may be a capacitive switch, an optical switch or other switch elements that may be configured to detect the switching between the first bottom surface 21 and the second bottom surface 22 and generate a detect signal correspondingly.

In other embodiments, the actuator 27 may be a gyroscope or an accelerometer. For example, disposing a gyroscope or an accelerometer in the dual mode optical navigation device 2, when one of the first bottom surface 21 and the second bottom surface 22 in contact with the working surface S changes from the first bottom surface 21 to the second bottom surface 22 or from the second bottom surface 22 to the first bottom surface 21, the gyroscope or the accelerometer may generate a detect signal Sd for the process unit 28 determining the mode of the dual mode optical navigation device 2. The actuator 27 may be integrated with the process unit 28 as a control chip when the actuator 27 is a gyroscope or an accelerometer.

Similarly, parameters associated with the actuator 27 may be previously set before the dual mode optical navigation device 2 leaves the factory. For example, momentum parameters associated with one of the first bottom surface 21 and the second bottom surface 22 in contact with the working surface S changing from the first bottom surface 21 to the second bottom surface 22 or from the second bottom surface 22 to the first bottom surface 21 are respectively previously saved in a memory unit. Therefore, the process unit 28 may switch the dual mode optical navigation device 2 to the first mode when the first bottom surface 21 contacts with the working surface S and switch the dual mode optical navigation device 2 to the second mode when the second bottom surface 22 contacts with the working surface S according to the detect signal outputted by the actuator 27.

As mentioned above, the conventional optical navigation device only relatively controls cursor movements according to a displacement and have problems of low accuracy, poor durability and large volume. Therefore, the present disclosure further provides a dual mode optical navigation device and a mode switching method thereof that may have a cursor control mode and a gesture operation mode simultaneously, and may determine whether a first bottom surface or a second bottom surface contacts with a working surface according to an image feature of an image frame associated with the working surface (FIGS. 1, 2 and the first embodiment) or according to a detect signal of a gyroscope, an accelerometer or a switch element (FIGS. 4, 5 and the second embodiment) thereby switching the mode of the dual mode optical navigation device to control a cursor movement or perform a gesture operation. Accordingly, the problems existing in the conventional optical navigation device may be overcome.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A dual mode optical navigation device, configured to operate in a first mode or a second mode on a working surface, the dual mode optical navigation device comprising:
an image sensor configured to capture an image frame of the working surface; and
a processor configured to
calculate a ratio of a bright area and a dark area in one image frame captured by the image sensor,
enter the first mode in response to the calculated ratio of the bright area and the dark area being larger than a ratio threshold, and
enter the second mode in response to the calculated ratio of the bright area and the dark area being within a ratio threshold range, wherein the ratio threshold range is smaller than the ratio threshold.

2. The dual mode optical navigation device as claimed in claim 1, wherein the first mode is a mode for controlling a cursor movement.

3. The dual mode optical navigation device as claimed in claim 1, wherein the second mode is a mode for performing a gesture operation.

4. The dual mode optical navigation device as claimed in claim 1, further comprising:
a light source configured to illuminate the working surface,
wherein the image sensor comprises a film coating configured to filter out spectrums other than a spectrum of the light source.

5. The dual mode optical navigation device as claimed in claim 1, wherein in response to the calculated ratio of the bright area and the dark area being between the ratio threshold and the ratio threshold range, the processor is configured to not post-process the image frame.

6. The dual mode optical navigation device as claimed in claim 1, further comprising a gyroscope configured to generate a detection signal for confirming the first mode and the second mode.

7. A dual mode optical navigation device, configured to operate in a first mode or a second mode on a working surface, the dual mode optical navigation device comprising:
an image sensor configured to capture an image frame of the working surface; and
a processor configured to
calculate a first average brightness of a fully bright image frame, and enter the first mode in response to the first average brightness being larger than a brightness threshold, and
calculate a second average brightness of a bright area and a dark area contained in one captured image frame, and enter the second mode in response to the second average brightness of the bright area and the dark area within a brightness threshold range.

8. The dual mode optical navigation device as claimed in claim 7, wherein the first mode is a mode for controlling a cursor movement.

9. The dual mode optical navigation device as claimed in claim 7, wherein the second mode is a mode for performing a gesture operation.

10. The dual mode optical navigation device as claimed in claim 7, further comprising:
a light source configured to illuminate the working surface,
wherein the image sensor comprises a film coating configured to filter out spectrums other than a spectrum of the light source.

11. The dual mode optical navigation device as claimed in claim 7, further comprising a gyroscope configured to generate a detection signal for confirming the first mode and the second mode.

12. An optical navigation device, configured to operate on a working surface to control a cursor movement on a display device or perform a gesture operation, the optical navigation device comprising:
an image sensor configured to capture image frames of the working surface; and
a processor configured to
calculate a ratio of a bright area and a dark area in one image frame captured by the image sensor,
control the cursor movement in response to the calculated ratio of the bright area and the dark area being larger than or equal to a ratio threshold,
perform the gesture operation in response to the calculated ratio of the bright area and the dark area being within a ratio threshold range, wherein the ratio threshold range is smaller than the ratio threshold, and
neither control the cursor movement nor perform the gesture operation in response to the calculated ratio of the bright area and the dark area being between the ratio threshold and the ratio threshold range.

13. The optical navigation device as claimed in claim 12, wherein the gesture operation comprises window scrolling, object zooming and volume control.

14. The optical navigation device as claimed in claim 12, wherein the processor is configured to
calculate displacement according to the image frames of the working surface successively captured by the image sensor, and
control the cursor movement or perform the gesture operation according to the calculated displacement.

* * * * *